United States Patent Office 2,995,569
Patented Aug. 8, 1961

2,995,569
PROCESS FOR PREPARATION OF ALKYL-1,2-DITHIOLE-3-THIONES
Lyle A. Hamilton, Pitman, N.J., and Phillip S. Landis, Des Plaines, Ill., assignors to Socony Mobil Oil Company, Inc., a corporation of New York
No Drawing. Filed May 2, 1957, Ser. No. 656,486
8 Claims. (Cl. 260—327)

This invention relates broadly to the sulfurization of olefins. More specifically, it relates to a novel method for sulfurizing olefins, such as di-isobutylene and tri-isobutylene, to produce compounds having the ring structure:

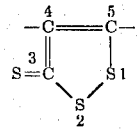

with the ring positions numbered as indicated. Still more specifically, it relates to a new method for sulfurizing olefins at atmospheric pressure to produce such compounds. A specific embodiment of the invention is the provision of a number of new reaction products of the aforesaid character by the reaction of certain olefins, such as tri-isobutylene, with sulfur at atmospheric pressure. Another embodiment provides a means of producing reaction products of the aforesaid nature which are non-corrosive. These non-corrosive products have been found to be excellent antioxidants for automotive engine oils.

The sulfurization of di-isobutylene to produce compounds of the aforesaid type has been known heretofore. The product is a mixture of two isomeric compounds which conform to the empirical formula $C_8H_{12}S_3$ and which have the following formulae:

(a)

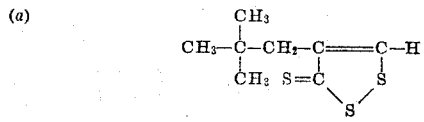

and (b)

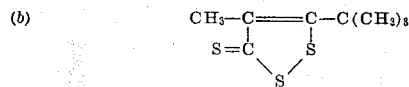

Different nomenclatures have been used in the art with respect to such compounds. Chemical Abstracts has identified them broadly as alkyl-substituted, 1,2-dithiole-3-thiones, the specific compounds being identified by the alkyl substituents on the 4 and 5 positions on the ring. Thus, isomer (a) is named 4-neopentyl-1,2-dithiole-3-thione, while isomer (b) is 4-methyl-5-tertiary butyl-1,2-dithiole-3-thione. Elsewhere in the art, however, isomer (a) has been called 4-neopentyl-1,2-dithia-4-cyclopentene-3-thione, while isomer (b) has been called 4-methyl-5-tertiary butyl - 1,2 - dithia-4-cyclopentene-3-thione. The Chemical Abstracts nomenclature is used herein, however, as it is considered to represent the preferred practice.

The isomer 4-neopentyl-1,2-dithiole-3-thione is an orange-colored crystalline solid which melts at about 87° C., while the isomer 4-methyl-5-tertiary butyl-1,2-dithiole-3-thione is a yellowish-orange crystalline solid having a melting point of about 80° C. The product contemplated herein, which is a mixture of the two isomers, is an orange-colored crystalline solid which melts over a range of from about 50° C. to about 70° C.

As is well known, di-isobutylene ($C_8H_{16}$) is a mixture consisting of about 80%, by weight, of 2,4,4-trimethyl pentene-1 and about 20%, by weight, of 2,4,4-trimethyl pentene-2. The empirical equation for the reaction between di-isobutylene and sulfur to form the mixed thione product herein contemplated is believed to be as follows:

$$C_8H_{16}+5S \rightarrow C_8H_{12}S_3+2H_2S$$

Although the 1,2-dithiole-3-thione, $C_8H_{12}S_3$, product mixture has been produced by the reaction between di-isobutylene and sulfur, much difficulty has been encountered in the prior art in conducting the reaction so as to obtain the product compounds in good yield. Furthermore, as far as is known, the art has not disclosed the reaction between olefins, such as tri-isobutylene and sulfur to provide any significant identifiable amount of 1,2-dithiole-3-thione type product. The present invention, however, provides a method whereby a number of other olefinic hydrocarbons, including tri-isobutylene, may be reacted with sulfur to produce 1,2-dithiole-3-thione products in good yield.

Referring briefly to the prior art, it is seen that Spindt, Stevens and Baldwin, J.A.C.S. 73, 3693 (1951), conducted the reaction between sulfur and di-isobutylene at 200° C. under autogenic pressure for periods of from 1 to 10 hours. The crude reaction product thus obtained was digested with ether or pentane and chilled to —60° C. to separate a crystalline solid. This solid was a mixture of the isomeric dithiole-3-thiones as mentioned above. The yields obtained ranged from about 20 to about 40% of theoretical. The separation and identification of the two isomers, 4-neopentyl-1,2-dithiole-3-thione and 4-methyl-5-tertiary butyl-1,2-dithiole-3-thione are described.

Also, U.S. Patent No. 2,535,705 discloses the preparation of the mixed dithiole-3-thiones by a process involving the reaction of 1 mole of di-isobutylene with from 1 to 5 moles, preferably 2.5 moles, of sulfur, at 140–350° C. under autogenic pressure, followed by crystallization from solvents at low temperature. The only yield described in this patent amounted to 23% of theoretical for the crystalline mixed thiones. The disclosure indicates that the reaction does not go to completion and that sulfur charged in excess of 2.5 atoms per mole of di-isobutylene is recovered unchanged.

Finally, the patent to Stevens et al., No. 2,658,900, discloses a method for conducting the sulfurization of di-isobutylene designed to produce the dithiole-3-thione product mixture in improved yield. The method comprises charging the di-isobutylene beneath the surface of the molten sulfur, maintained at a temperature between about 200 and 230° C. and under a pressure of from 25 to 120 pounds per square inch. In that method a portion of the hydrogen sulfide formed in the reaction is retained in the reaction zone to provide a pressure within the aforesaid range, some of the hydrogen sulfide being bled off when the reaction pressure increases above the said range. The patentees propose this method as providing the best means of preventing side reactions due to contacting of the hydrogen sulfide with the reaction mass, while at the same time maintaining the di-isobutylene reactant in the liquid state. The yields of the dithiole-3-thione product mixture obtained by this method were in the neighborhood of 75 to 80% of theoretical, based on the amount of sulfur charged to the reaction. The examples disclosed by Stevens et al. indicate the presence of substantial amounts of unreacted sulfur in the crude reaction product. As will be shown hereinafter, the process of the present invention provides for substantially complete utilization of the sulfur charged to the reaction.

It is seen then that the prior art methods for conducting the sulfurization of di-isobutylene all involve the utilization of superatmospheric pressures, and that the best yields of the isomeric dithiole-3-thione mixture were those shown by the Stevens et al. patent, No. 2,658,900. The present applicants, however, have found that the reaction can be conveniently conducted at atmospheric pressure with the obtainment of yields of the dithiole-3-thione product in the order of 90% of theoretical, based on the sulfur charged to the reaction. Accordingly, it is seen that this new method, while still affording high yields of the dithiole-3-thione product, has the further important advantage that it does not require the use of special, expensive, high pressure equipment of the character utilized in the prior art methods.

Furthermore, when this new method is applied to the reaction of sulfur with certain other olefins, such as tri-isobutylene, 1,2-dithiole-3-thione products, not heretofore reported in the art, are produced in substantial yield.

It has also been found and it is a further specific embodiment of this invention, that the yields of dithiole-3-thiones obtainable by the reaction of certain olefins, such as tri-isobutylene, with sulfur at atmospheric pressure can be greatly increased by the utilization of a simple modification of the method of this invention, hereinafter defined.

It is, therefore, the primary object of this invention to provide a new method for effecting the reaction between di-isobutylene and sulfur to produce 1,2-dithiole-3-thiones. It is a further object to provide certain new 1,2-dithiole-thione products from the reaction of olefins other than di-isobutylene with sulfur. It is also an object to provide a method whereby the yields of certain 1,2-dithiole-3-thione type products produced by the reaction of sulfur and certain olefins is greatly increased. It is a further object to provide a method for producing 1,2-dithiole-3-thione products which are non-corrosive. A still further object is to provide motor oil compositions containing minor amounts of the non-corrosive 1,2-dithiole-3-thione. Other and further objects of the invention will be apparent from the following description thereof.

In accordance with the invention, the reaction between the sulfur and the di-isobutylene (or other olefins hereinafter defined) is conducted in a reaction vessel which is vented to the atmosphere through a reflux condenser. In conducting the reaction, the sulfur is heated in the reactor to the required temperature level of from about 180° C. to about 240° C. and then the liquid di-isobutylene is charged to the reaction. As the di-isobutylene is fed to the reactor, hydrogen sulfide, which is formed in the resulting reaction, is allowed to pass from the reaction zone via the condenser, while at the same time the unreacted portion of the charged di-isobutylene, which is vaporized and seeks to escape via the condenser, is recondensed and returned to the reaction zone. The reaction thus proceeds at atmospheric pressure with continuous removal of hydrogen sulfide gas from the reaction zone substantially as rapidly as it forms. The rate of addition of the di-isobutylene is controlled so as to hold the temperature of the reaction at the required level and at the same time avoid build-up of unreacted di-isobutylene in the system, as indicated by an increased rate of di-isobutylene reflux. Thus, too slow an addition of di-isobutylene will allow the temperature to rise unless the applied heat is reduced, whereas too rapid an addition of di-isobutylene will cause excessive reflux which in turn causes rapid loss of heat and lowering of the reaction temperature. Proper control of the rate of addition, however, provides for maintenance of the reaction temperature at the desired level. The completion of the reaction is indicated by essential cessation of hydrogen sulfide evolution from the reaction vessel and also by build-up of unreacted di-isobutylene in the system, as indicated by continued reflux, even when the addition of fresh di-isobutylene charge is stopped. The crude reaction product is subjected to vacuum distillation at about 1 mm. of mercury pressure. The product distills at about 140–170° C. at this pressure. Yields of about 90% of theory, based on the amount of sulfur charged to the reaction, of the crystalline 1,2-dithiole-3-thione product are obtained. The product is a mixture of the same two thiones present in the product of Spindt et al. (supra) as shown by sulfur analyses, molecular weight determinations and ultra-violet spectra. It should be noted that Spindt et al. purified his crude product by crystallization, due to the fact that his principal problem was the removal of unreacted sulfur. The present process, however, provides a reaction product which is substantially free of elemental sulfur (containing no more than about 1–2%), but which is contaminated with tar. The purification of this product, therefore, can be readily effected by distillation, which, of course, would not separate large amounts of sulfur from the thiones. As will be appreciated from Examples 3 and 4, which follow, a product of the highest purity, i.e., one which is entirely free of unreacted sulfur, may be obtained by adding an additional amount of di-isobutylene, say about 10%, at the end of the initial reaction and continuing to heat the reaction mass for a short period.

The required proportions of reactants are 1 mole of di-isobutylene and 5 moles of sulfur. However, it is advantageous from the standpoint of maximum yield and purity of the thione product to charge a small excess, say at least from about 5% to about 15%, of di-isobutylene over the required stoichiometric amount to the reaction.

As indicated above, the di-isobutylene is charged to the reaction substantially about as rapidly as it is consumed, excess vaporization thereof, which would result from too rapid a charge rate, being avoided. Under the conditions of the method, the reaction is substantially complete when the di-isobutylene has been completely charged, although an additional heating period may be employed to insure completion of the reaction. The maximum rate at which the di-isobutylene can be charged will, of course, depend upon the particular conditions of the reaction and the limitations imposed by the equipment used. In general, it can be said that the time required for addition of the di-isobutylene under the conditions of the several examples presented herein ranges from about 5 to about 25 hours. However, it should be understood that longer periods may be used without harmful effect where a relatively rapid charge rate is not particularly sought.

As afore-indicated, the temperature suitable for the reaction ranges from about 180° C. to about 240° C., the preferred temperatures being from 200° C. to 220° C. Thus, at 250° C. the yield of crystalline thiones falls off to about 55% due to decomposition of the product with tar formation, whereas at 160° C. to 170° C. the reaction is extremely slow.

The following examples will serve to illustrate typical procedures for the preparation of the isomeric $C_8H_{12}S_3$ product mixture from di-isobutylene.

EXAMPLE 1

In a 500-milliliter, four-necked flask there was placed 80 grams (2.5 moles) of sulfur. The flask was fitted with a stirrer, a thermometer, a dropping funnel and an efficient condenser. The sulfur was heated, with stirring to 210° C. and 60 grams (0.53 mole) of commercial di-isobutylene, B.R. 98° C. to 102° C., was added dropwise in six and one-half hours. The addition was made in such a manner as to maintain a pot temperature of 190° C. to 220° C.

After the reaction, the crude product remaining in the flask was vacuum distilled at about 1 millimeter of pressure and 92.5 grams of distillate was recovered boiling in the range 155° C. to 170° C. at this pressure. This product, representing a yield of 90.7% of theoretical (based on the sulfur charged to to the reaction) contained 46.9% sulfur and melted over the range 55° C. to 70° C. The ultra-violet spectrum obtained for this product corresponded closely to that for the $C_8H_{12}S_3$ isomers, as reported in the literature by Spindt et al. (supra).

It should be noted that in a number of the examples presented herein, the distillation of the thione product was conducted at a rapid rate under high vacuum. Under such conditions, of course, little fractionation is obtained and even a pure compound will show a considerable spread between initial and final boiling point. However, in Example 4, which was initially distilled under the aforesaid conditions, the product was carefully fractionated to obtain the true boiling range.

EXAMPLE 2

This product was prepared in a manner similar to Example 1 except that a tenfold increase in the amount of reactants was used. Twelve hours were required for the addition of the diisobutylene.

Vacuum distillation of the crude product gave a total of 923 grams (90.5% yield) boiling in the range for di-isobutylene thiones. Two fractions were collected:

(*a*) Boiling range 120° C. to 155° C. at 3 mm. 46.9% S, mol. wt. 205.

(*b*) Boiling range 155° C. to 165° C. at 3 mm. 48.0% S, mol. wt. 210.

The following example illustrates the application of the method of the invention as applied to the sulfurization of tri-isobutylene.

EXAMPLE 3

Sulfur (160 grams, 5 moles) was placed in a 500-milliliter, 4-necked flask fitted with a stirrer, thermometer, condenser and dropping funnel. With the sulfur heated to 190° C. to 200° C., tri-isobutylene (168 grams, one mole) was added dropwise in two hours. Considerable hydrogen sulfide was evolved during the heating period. The crude product was then vacuum-distilled and 212 grams of material boiling in the range of 135° C. to 185° C. at 1 millimeter was collected. On standing, solid sulfur separated and was filtered off, leaving 175 grams of red oil. It was hoped that redistillation would remove some of the free sulfur dissolved in the oil, therefore, 135 grams were redistilled at 1 to 3 millimeters of pressure and 125 grams of distillate boiling between 130° C. and 185° C. collected. This material still contained free sulfur and was quite corrosive to copper. A 20-gram sample of the redistilled red oil was washed with 10% KOH to remove free sulfur and the product was recovered by extraction with ether. Evaporation of the solvent left 18.3 grams of red oil which was equivalent to a yield of 147 grams on the total run, i.e., about 55% of theoretical, based on the sulfur charged. This red oil was found by analysis to contain 35.3% sulfur. Further identifying properties of this tri-isobutylene product, which is believed to be comprised principally of a new compound, 4-neopentyl - 5 - tetiary butyl-1,2-dithiole-3-thione, are presented in connection with Example 4 below.

As aforesaid, by a modification of the method of the invention, the yield of the thione product from tri-isobutylene may be substantially increased. Thus, the yield is increased from about 55%, obtained without the modification, to about 90%, of theoretical, based on the sulfur charged to the reaction.

This modification involves the addition of from about 10% to about 50%, by weight, of preformed 1,2-dithiole-3-thione product to the sulfur in the reaction zone, prior to commencement of addition of the tri-isobutylene to the reaction. It has been found that the added 1,2-dithiole-3-thione product catalyzes the reaction between the sulfur and the tri-isobutylene, so that a faster addition of the tri-isobutylene is permissible. Also, the added material lowers the viscosity of the reaction mass so that stirring is facilitated. A series of reactions using di-isobutylene, tri-isobutylene and mixtures thereof are summarized in Table I, wherein the high yields obtained, particularly with tri-isobutylene, are evident.

Table 1
SULFURIZATION OF DI- AND TRI-ISOBUTYLENE

| Ex. No. | Reactants | G. | Reaction conditions | | Yield, trithione | | B.P. at 2-5 mm, °C. | Percent S | Mol. weight |
|---|---|---|---|---|---|---|---|---|---|
| | | | Time, hours | Temp., °C. | Grams | Percent [1] | | | |
| 6 | Sulfur | 80 | 5 | 200 | 118 | 87 | 110-170 | 45.3 | |
| | Di-isobutylene | 62 | | | | | | | |
| | Di-isobutylene thione | 30 | | | | | | | |
| 7 | Sulfur | 3,218 | 19 | 200-220 | 4,173 | 86 | 145-185 | 45.8 | 205 |
| | Di-isobutylene | 2,352 | | | | | | | |
| | Di-isobutylene thione | 775 | | | | | | | |
| 8 | Tri-isobutylene | 232 | 12 | 200 | 511 | 91 | 110-190 | 43.0 | |
| | Di-isobutylene | 156 | | | | | | | |
| | Sulfur | 320 | | | | | | | |
| | Di-isobutylene thione | 100 | | | | | | | |
| 9 | Tri-isobutylene | 336 | 13 | 200 | 525 | 88 | 110-190 | 42.7 | |
| | Di-isobutylene | 54 | | | | | | | |
| | Sulfur | 320 | | | | | | | |
| | Mixed thione (Ex. 8) | 100 | | | | | | | |
| 10 | Tri-isobutylene | 360 | 8 | 200 | 571 | 82 | 110-185 | 42.7 | |
| | Sulfur | 320 | | | | | | | |
| | Di-isobutylene thione | 170 | | | | | | | |
| 11 | Tri-isobutylene | 420 | 11 | 200 | 685 | 94 | 150-200 | 39.8 | |
| | Sulfur | 320 | | | | | | | |
| | Mixed thione (Ex. 10) | 200 | | | | | | | |
| 12 | Tri-isobutylene | 340 | 13 | 210 | 616 | 89 | 110-180 | 37.5 | |
| | Sulfur | 320 | | | | | | | |
| | Mixed thiones (Ex. 11) | 150 | | | | | | | |
| 13 | Tri-isobutylene | 1,350 | 14 | 210 | 2,465 | 91 | 120-185 | 37.5 | 255 |
| | Di-isobutylene [2] | 120 | | | | | | | |
| | Sulfur | 1,280 | | | | | | | |
| | Tri-isobutylene thione (Ex. 12) | 600 | | | | | | | |
| 14 | Tri-isobutylene | 1,485 | 22½ | 200-215 | 2,476 | 93 | 120-185 | 36.5 | |
| | Sulfur | 1,285 | | | | | | | |
| | Tri-isobutylene thione | 600 | | | | | | | |

[1] Yield based on sulfur charged.
[2] Di-isobutylene added after the tri-isobutylene had been added.

The modified method of the invention also permits obtainment of 1,2-dithiole-3-thione products from olefins which otherwise give no significant amount of thione product when reacted with sulfur. Thus, such olefins as propylene trimer, propylene tetramer, polymer gasoline from mixed butenes and propylene, 2-methyl pentene-1 and alpha-pinene were successfully reacted. These reactions are listed in Table II. The product in each instance exhibited the characteristic ultra-violet spectrum of the alkyl-substituted-1,2-dithiole-3-thiones. As shown by the data, direct reaction of these olefins, i.e., without the thione catalyst, gave only tar and no thione product.

tures of dithiole-3-thiones will be formed. To prepare any of the pure compounds, however, it is best to use as a catalyst the thione corresponding to the olefin to be sulfurized.

The modified procedure of the invention is illustrated by the following example. This example is also illustrative of the preparation of the new tri-isobutylene thione product.

EXAMPLE 4

Sulfur (1619 grams) and sulfurized tri-isobutylene (800 grams) were placed in a 4-necked, 5-liter flask fitted with a stirrer, thermometer, dropping funnel and Table II
SULFURIZATION OF MISCELLANEOUS OLEFINS

| Example number | Reactants | G. | Reaction conditions | | Yield distillate, thione | | Percent S | Fraction | B.P. at 2-5 mm, °C. |
|---|---|---|---|---|---|---|---|---|---|
| | | | Time, hours | Temp., °C. | Grams | Percent [1] | | | |
| 15 | 2-methylpentene-1<br>Sulfur | 84<br>160 | 4 | 200 | Nil | 0 | | | |
| 16 | 2-methylpentene-1<br>Sulfur<br>Di-isobutylene thione | 45<br>80<br>30 | 5 | 200 | 73 | 48 | 48.0<br>52.1 | 1<br>2 | 110-145<br>145-155 |
| 17 | Polymer gasoline (B.P. 190-227° F.)<br>Sulfur | 60<br>80 | 2 | 200 | Nil | 0 | | | |
| 18 | Polymer gasoline (B.P. 190-227° F.)<br>Sulfur<br>Di-isobutylene thione | 60<br>80<br>30 | 5 | 180-200 | 70 | 38 | | | |
| 19 | Propylene tetramer<br>Sulfur | 84<br>80 | 4 | 205 | Nil | 0 | | | |
| 20 | Propylene tetramer<br>Sulfur<br>Di-isobutylene thione | 168<br>160<br>250 | 1 | 200 | 342 | | | 1<br>2 | 70-110<br>110-180 |
| 21 | Alpha-pinene<br>Sulfur | 408<br>480 | 1 | 210 | Nil | 0 | | | |
| 22 | Alpha-pinene<br>Sulfur<br>Di-isobutylene thione | 82<br>96<br>18 | 2 | 200 | 32 | | | | |
| 23 | Propylene trimer<br>Sulfur<br>Di-isobutylene thione | 450<br>480<br>200 | 9 | 180 | 520 | | | | |

[1] Yield based on sulfur charged.

In general, it can be said that olefins which will yield 1,2-dithiole-3-thiones on sulfurization by the modified method of the invention are those boiling below about 225° C. and having the following structure, or which can form these structures by a simple shift of the double bond:

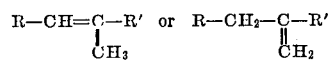

R and R' are selected from the group consisting of hydrogen, alkyl, aryl, alkaryl, aralkyl and cycloalkyl radicals. A very small group of olefins, those where R is attached at a carbon atom also having attached three other carbon atoms, for example, $(CH_3)_3C-$ or

and R' is methyl or R as defined above, form very high yields of thiones on sulfurization. This is believed to be because of unavailability of hydrogens to partake in further reaction through elimination as hydrogen sulfide, which then allows addition of sulfur to the unsaturated linkage formed. Such further reaction generally results in polymer or tar formation and thus in lower yields of desired product. When R or R' is a straight chain alkyl group, yields are lower than 85% to 90% due to some tar formation. When R or R' contains a very reactive grouping tar formation may approach 100%.

As seen from the data in Tables I and II, mixtures of dithiole-3-thiones, such as those from di- and tri-isobutylene, may be used as catalysts. In such cases, mixtures of dithiole-3-thiones will be formed. To prepare efficient condenser. With the flask contents heated at 200° C. to 215° C., tri-isobutylene (1848 grams) was added dropwise over a period of 9 hours. After 12 additional hours at 205° C. to 215° C., 120 grams of di-isobutylene were added, in ½ hour, and the temperature of 205° C. to 220° C. maintained for an additional 2 hours. The crude product was then vacuum-distilled and a fraction boiling at 120° C. to 190° C., at 1 to 5 millimeters of pressure, was collected. This fraction, which weighed 3004 grams (84.5% yield), analyzed 36.32% sulfur. It was a red oil having a specific gravity of 1.12 at 87° F., and an A.S.T.M. pour point of −10° F. The sample was not hazy or crystalline at −10° F. The refractive index for the red line of hydrogen, at 20° C., was 1.6425. A normal R.I. for the sodium D line could not be obtained using an Abbé refractometer. This product oil was essentially non-corrosive to copper. A 0.5% solution in mineral oil gave only a trace of stain on a copper strip immersed for 24 hours at 100° C. The non-corrosiveness of this product, as compared to that shown in Example 3, is due to the addition of di-isobutylene and continued heating after the initial reaction had ceased. It has been found that di-isobutylene is the most effective olefin for use in this manner and it is, therefore, preferred to use di-isobutylene even when the initial reaction involves a different olefin, such as tri-isobutylene, which reacts relatively slow with the sulfur.

The aforedescribed di-isobutylene treating step can be applied to any dithiole-3-thione product which is contaminated with sulfur to effect purification thereof. Products obtained by conducting the sulfurization reaction under pressure, for example, have been found to be markedly corrosive due to the presence of sulfur. Applicants have found that conventional methods of reducing corrosivity such as by washing with NaOH or Na₂S, or by treating with metallic copper, would not make these products non-corrosive. Also, numerous recrystallizations of the corrosive products prepared by conducting the sulfurization reaction under pressure failed to make these products non-corrosive. However, the di-isobutylene treating step has been found to be most effective with respect to purifying these products and making them non-corrosive. This step, therefore, which is the only means known to applicants for making corrosive thione products non-corrosive, and which is necessarily conducted at atmospheric pressure, comprises an important aspect of the method of this invention. It has been found that the non-corrosive dithiole-3-thione products produced by this di-isobutylene treating step are highly useful as anti-oxidant additives for motor lubricating oils of both the mineral and synthetic type, as is shown hereinbelow.

The identification of the distilled red oil from Example 4 as the new compound, 4-neopentyl-5-tertiary butyl-1,2-dithiole-3-thione, was carried out as follows. A 100-gram sample of the distilled oil was fractionated under vacuum through a Piros-Glover spinning band column. The results are presented in Table III. The first fraction, amounting to 3.7 weight percent, was found to contain 30% sulfur and appears to be a mixture of lower sulfides and not thione. The second fraction, amounting to 4.5 weight percent, solidified at room temperature to yellow crystals. The sulfur analysis and properties of this fraction showed it to be thiones from di-isobutylene. Analysis and properties of fractions 3 (4.7 weight percent) and 4 (5.0 weight percent) showed them to be mixtures of dithiole-3-thiones from di- and tri-isobutylenes, whereas fractions 4A and all later fractions contain only thiones from tri-isobutylene. Based on refractive index, it appeared that fractions 4A to 17, inclusive, 76.7% of the total charge to the still, are essentially one pure material. Infrared spectra were obtained on fractions 5, 8 and 15. The spectra were substantially identical and were characteristic of dithiole-3-thiones. This confirms our belief that our new material is essentially a single compound.

*Table III*

VACUUM DISTILLATION OF SULFURIZED TRI-ISOBUTYLENE PRODUCT (EXAMPLE 4)

| Cut No. | Weight | | Refractive index, $n_C^{20}$ | Pressure, mm. | Vapor Temp., °C. |
|---|---|---|---|---|---|
| | G. | Percent | | | |
| 1 | 3.66 | 3.7 | 1.5381 | 1 | 46 |
| 2 | 4.51 | 4.5 | Solid | 1 | 111 |
| 3 | 4.74 | 4.7 | 1.6582 | 1 | 144 |
| 4 | 5.02 | 5.0 | 1.6526 | 1 | 148 |
| 4A | 20.52 | 20.5 | 1.6470 | 1 | 149 |
| 5 | 3.92 | 3.9 | 1.6482 | 2 | 164 |
| 6 | 4.13 | 4.1 | 1.6481 | 2 | 166 |
| 7 | 4.81 | 4.8 | 1.6478 | 1 | 152 |
| 8 | 4.77 | 4.8 | | 1 | 152 |
| 9 | 4.21 | 4.2 | 1.6477 | 1 | 152 |
| 10 | 4.74 | 4.8 | 1.6477 | 1 | 152 |
| 11 | 4.85 | 4.9 | 1.6478 | 1 | 152 |
| 12 | 4.44 | 4.4 | 1.6476 | 1 | 152 |
| Hang up | 1.00 | 1.0 | | | |
| 13 | 4.44 | 4.4 | 1.6474 | 1.2 | 157 |
| 14 | 4.20 | 4.2 | 1.6476 | 1.2 | 157 |
| 15 | 4.28 | 4.3 | 1.6476 | 1.2 | 158 |
| 16 | 4.17 | 4.2 | 1.6476 | 1.2 | 159 |
| 17 | 2.22 | 2.2 | 1.6475 | 1.2 | 159 |
| Hang up | 0.87 | 0.9 | | | |
| Bottoms | 4.53 | 4.5 | Black | | |
| Original charge | 100 | | 1.6425 | | |

Chemical analyses of the distilled product as a whole and of fraction 9 are compared below with those of the thione compound, $C_{12}H_{20}S_3$.

| | Example 4 | Fraction 9 | $C_{12}H_{20}S_3$ |
|---|---|---|---|
| Percent carbon | 55.40 | 55.14 | 55.38 |
| Percent hydrogen | 7.77 | 7.79 | 7.69 |
| Percent sulfur | 36.32 | 36.75 | 36.93 |
| Total | 99.49 | 99.68 | 100.00 |
| Mol. weight | | 265 | 260 |

The ultra-violet spectrum of the crude red oil product and the infrared spectrum of the pure material (cut 9) were obtained. Both of these spectra were characteristic of dithiole-3-thiones.

This new material was found to undergo reactions typical of alkyl-1,2-dithiole-3-thiones. Thus, it forms complex metal salts with HgCl₂ and with some other inorganic salts. It forms a methiodide:

| | Analysis | |
|---|---|---|
| | Found | Theory |
| HgCl₂ complex: | | |
| Percent sulfur | 17.89 | 18.07 |
| M.P., °C | 218–221 | |
| Methiodide: | | |
| Percent sulfur | 22.59 | 23.8 |
| M.P., °C | 156–161 | |

Further identification of the structure of the new material was obtained by alcoholic caustic hydrolysis of the product to form acids. The literature shows that the 1,2-dithiole-3-thione ring is cleaved by caustic to produce acids as below:

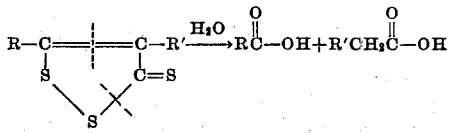

When R is t-butyl and R' is neopentyl, as in the product of this invention, two acids (A) trimethylacetic and (B) γ,γ'-dimethylvaleric acids should be obtained.

Two acids obtained from the alcoholic caustic hydrolysis of the product were definitely established as trimethylacetic and γ,γ'-dimethylvaleric acids.

ACID A (TRIMETHYLACETIC ACID)

| Derivative | Theory | | Found | |
|---|---|---|---|---|
| | Percent N | M.P., °C. | Percent N | M.P., °C. |
| Trimethylacetanilide | 7.91 | 129 | 7.86 | 131 |
| p-Bromophenacyl-trimethylacetate | | 76 | | 75–6 |

ACID B (γ,γ'-DIMETHYLVALERIC ACID

| Derivative | Theory | | Found | |
|---|---|---|---|---|
| | Percent N | M.P., °C. | Percent N | M.P., °C. |
| γ,γ'-Dimethylvaleranilide | 6.82 | | 6.83 | 141-2 |
| γ,γ'-Dimethylvaleramide | 10.84 | 141 | 10.30 | 139-41 |

This adds conclusive evidence that the structure of the product is:

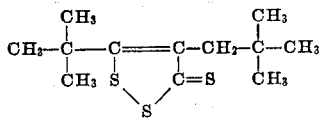

This new material is useful as an intermediate for the synthesis of aliphatic acids from $C_5$ to $C_7$ containing a terminal tertiary butyl group. It is an extremely effective agent for use in solutions or films designed to filter out ultra-violet and blue light. This property of filtering out ultra-violet light with extra effectiveness makes the material particularly useful in rubber and plastics as a stabilizer to prevent the deterioration caused by exposure to light.

The 1,2-dithiole-3-thione products of the invention also have important use as chemical intermediates in that they are readily converted to organic acids as shown hereinabove.

As aforeindicated, the non-corrosive dithiole-3-thione products contemplated herein are particularly useful as anti-oxidants for mineral and synthetic lubricating oils. They are especially effective as oxidation stabilizers for use in motor oils of the mineral oil type containing detergents such as alkali or alkaline earth metal salts which normally tend to promote oxidation of such oils. The preferred materials for this purpose are the non-corrosive alkyl-1,2-dithiole-3-thiones from diisobutylene and triisobutylene. The effectiveness of these materials in preventing oxidation of oils and corrosion by oils is shown in the following tests.

CATALYTIC OXIDATION STABILITY TESTS (B-10)

This test determines the effectiveness of an additive in preventing catalytic oxidation of an oil. In this test, a 25 cc. sample of oil is placed in a 200 x 25 mm. test tube with (a) 15.6 sq. in. of sandblasted iron wire, (b) 0.78 sq. in. of polished copper wire, (c) 0.87 sq. in. of polished aluminum wire, and (d) 0.167 sq. in. of polished lead surface. The oil is then heated to a temperature of 260° F. and maintained at this temperature, while dry air is being passed therethrough, at a rate of 18 liters per hour, for 40 hours. The results of the test are reported in terms of stability number of the additive. The stability number is the percentage of additive (in the oil) multiplied by 100, that reduces the N.N. (neutralization number) of the reference oil to a value of 2. Thus, the higher the additive stability number, the less effective is the additive and vice versa. An additive which has a stability number less than 100 is considered to be a good anti-oxidant.

The thione products of Examples 1 and 4 were subjected to the aforesaid test in an SAE solvent-refined Pennsylvania oil alone and in the presence of several commercial detergents. The results are shown in Table IV.

Table IV
OXIDATION STABILITY TEST (B-10)

| Thione product | Stability number in oil alone and in oil containing indicated detergents | | | | |
|---|---|---|---|---|---|
| | None | Detergent A (4.0%) | Detergent B (3.7%) | Detergent C (4.66%) | Detergent D (6%) |
| Example 1 | 30 | 35 | 35 | 28 | 22 |
| Example 4 | 25 | | | | |

Detergent A—barium salt of wax benzene sulfonate.
Detergent B—calcium salt of mixed alkylaryl and petroleum sulfonates.
Detergent C—calcium salt of oxidized mineral lubricating oil.
Detergent D—product of waxphenol, formaldehyde and amine.

LAUSON OS-2 STABILITY TEST

This test determines oil deterioration as indicated primarily by corrosion of copper-lead bearings and secondarily by engine cleanliness. A Lauson single cylinder, 4-cycle, liquid-cooled gasoline engine with splash lubrication using copper-lead bearings was operated for 100 hours under the following conditions: oil temperature, 270° F., jacket temperature, 212° F., speed, 1825 r.p.m., one-half throttle; 13:1 air:fuel ratio. Oil is added every 20 hours during the test.

The extent of bearing corrosion is measured by the loss of weight of the bearings during the test. The engine is also rated for cleanliness on a scale of from 0 to 100, 100 indicating a perfectly clean engine.

The thione products of Examples 1 and 4 were subjected to this test in (a) an SAE 20 grade Pennsylvania base oil and (b) in the same base oil containing 4% and 2.4% of typical commercial detergent additives. The test results are given in Table V.

Table V
LAUSON ENGINE TEST OS-2

| Thione additive | Conc., percent | Base oil | | Base oil plus 4.0% Detergent A [1] | | Base oil plus 2.4% Detergent B [2] | |
|---|---|---|---|---|---|---|---|
| | | ½ bearing weight loss, g. | Cleanliness rating | ½ bearing weight loss, g. | Cleanliness rating | ½ bearing weight loss, g. | Cleanliness rating |
| None | 0.0 | 0.275 | 69 | | | | |
| Example 1 | 0.25 | 0.023 | 71 | 0.054 | 86 | 0.093 | 84 |
| | 0.5 | 0.006 | 66 | 0.029 | 85 | 0.015 | 77 |
| Example 4 | 0.5 | 0.023 | 69 | 0.018 | 91 | | |

[1] Barium wax-benzene sulfonate.
[2] Calcium petroleum sulfonate.

It will be seen from the data in Table V that the non-corrosive thione products are effective oil anti-oxidants and that they are highly effective when used in detergent motor oils.

The non-corrosive thione compounds of the invention have also been found to be highly effective in protecting against corrosion of silver bearings, such as are used in large railroad diesel engines.

It will be appreciated that the thione compounds which have not been made non-corrosive are not utilizable as anti-oxidants in internal combustion engine oils.

The non-corrosive thione products of the invention have also been found to be effective as anti-oxidants in synthetic type (rather than petroleum base) lubricants. Thus, the triisobutylene thione product (Example 4) when subjected to the oxidation stability test (B-10) above described, utilizing synthetic type base oils, provided excellent oxidation inhibition as indicated by increase in N.N. (neutralization number) and lead (Pb) weight loss. When the test is used on synthetic oil bases, the measurement of oxidation is based on N.N. increase and lead weight loss. For example, in the case of di-2-ethyl hexyl sebacate the addition of 0.5% of the thione reduced the N.N. increase of the oil from 7.25 to 0.10 and the Pb weight loss from 472 mgs. to only 0.9 mg. Correspondingly effective anti-oxidant action has been demonstrated in tests conducted on propylene oxide polymer type oils.

The amount of the non-corrosive alkyl-1,2-dithiole-3-thiones to be utilized in the lubricating oil will range from about 0.1% to about 2%, by weight, however, amounts ranging from as little as 0.1% up to about 5% may be used depending upon the particular base oil and the amount of improvement desired. The amount of detergent additives which may be used in the motor oils containing the non-corrosive thione compounds of the invention will range from about 0.5% to about 10%, by weight the usual amount being from about 1% to about 5%. Other additives, designed to impart other improved properties to the oil, such as viscosity index improvers, pour point depressants, etc. may also be used in the oil.

It will be understood that although the principles of the invention have been illustrated herein by means of certain specific examples and embodiments thereof, it is not intended that the invention be limited in any way thereby, but only as indicated in the appended claims.

This application is a continuation-in-part of our application Serial No. 458,952, filed September 28, 1954, now abandoned.

What is claimed is:

1. The method for conducting the reaction between di-isobutylene and sulfur, at atmospheric pressure, to form a lower alkyl-substituted-1,2-dithiole-3-thione reaction product which comprises charging about 1 molar proportion of di-isobutylene in liquid form to contact with a reaction mass comprising about 5 molar proportions of molten sulfur in a reaction vessel which is vented to the atmosphere through a reflux condenser while maintaining the temperature of said vessel at from about 180° C. to about 240° C. whereby hydrogen sulfide formed in the resulting reaction is allowed to pass from the reaction vessel through the condenser substantially as rapidly as it is formed, but whereby at the same time any portion of the charged di-isobutylene which is vaporized in the reaction vessel and which passes to the condenser is refluxed to the reaction vessel, continuing to maintain the temperature within the reaction vessel at the aforesaid level after all of the di-isobutylene has been charged and at least until passage of hydrogen sulfide from the reaction vessel has substantially ceased and thereafter distilling the crude reaction product to recover the lower alkyl-substituted-1,2-dithiole-3-thione product therefrom.

2. The method for conducting the reaction between triisobutylene and sulfur, at atmospheric pressure, to from a lower alkyl-substituted-1,2-dithiole-3-thione reaction product which comprises charging about 1 molar proportion of tri-isobutylene in liquid form to contact with a reaction mass comprising about 5 molar proportions of molten sulfur in a reaction vessel which is vented to the atmosphere through a reflux condenser while maintaining the temperature of said vessel at from about 180° C. to about 240° C. whereby hydrogen sulfide formed in the resulting reaction is allowed to pass from the reaction vessel through the condenser substantially as rapidly as it is formed, but whereby at the same time any portion of the charged triisobutylene which is vaporized in the reaction vessel and which passes to the condenser is refluxed to the reaction vessel, continuing to maintain the temperature within the reaction vessel at the aforesaid level after all of the tri-isobutylene has been charged and at least until passage of hydrogen sulfide from the reaction vessel has substantially ceased and thereafter distilling the crude reaction product to recover the lower alkyl-substituted-1,2-dithiole-3-thione product therefrom.

3. The method for conducting the reaction between an olefinic hydrocarbon of the formula selected from the group consisting of $$R-CH=C-R'$$
$$\phantom{R-CH=}\overset{|}{CH_3}$$

and (b) 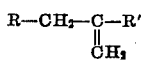

where R and R' are selected from the group consisting of hydrogen and lower alkyl radicals, and sulfur, at atmospheric pressure, to form a lower alkyl-substituted-1,2-dithiole-3-thione product, which comprises charging about 1 molar proportion of the olefinic hydrocarbon in liquid form to contact with a reaction mass comprising about 5 molar proportions of molten sulfur and from about 10 to about 50 weight percent, based on said sulfur, of a lower alkyl-substituted-1,2-dithiole-3-thione in a reaction vessel which is vented to the atmosphere through a reflux condenser while maintaining the temperature within said vessel at from about 180° C. to about 240° C. whereby hydrogen sulfide formed in the resulting reaction is allowed to pass from the reaction vessel through the condenser substantially as rapidly as it is formed but whereby at the same time any portion of the charged olefinic hydrocarbon which is vaporized in the reaction vessel and which passes to the condenser is refluxed to the reaction vessel, continuing to maintain the temperature within the reaction vessel at the aforesaid level after all of the olefinic hydrocarbon has been charged and at least until passage of hydrogen sulfide from the reaction vessel has substantially ceased and thereafter distilling the crude reaction product to recover the lower alkyl-substituted-1,2-dithiole-3-thione product therefrom.

4. The method for conducting the reaction between triisobutylene and sulfur at atmospheric pressure, to form 4-neopentyl-5-tertiary butyl-1,2-dithiole-3-thione, which comprises charging about 1 molar proportion of tri-isobutylene in liquid form to contact with a reaction mass comprising about 5 molar proportions of molten sulfur and from about 10 to about 50 weight percent, based on said sulfur, of a lower alkyl-substituted-1,2-dithiole-3-thione in a reaction vessel which is vented to the atmosphere through a reflux condenser while maintaining the temperature within said vessel at from about 180° C. to about 240° C. whereby hydrogen sulfide formed in the resulting reaction is allowed to pass from the reaction vessel through the condenser substantially as rapidly as it is formed, but whereby at the same time any portion of the charged tri-isobutylene which is vaporized in the reaction vessel and which passes to the condenser is refluxed to the reaction vessel, continuing to maintain the temperature within the reaction vessel at the aforesaid level after all of the tri-isobutylene has been charged and at least until passage of hydrogen sulfide from the reaction vessel has substantially ceased and thereafter distilling the crude reaction product to recover the 4-neopentyl-5-tertiary butyl-1,2-dithiole-3-thione therefrom.

5. The method for conducting the reaction between tri-isobutylene and sulfur at atmospheric pressure, to form 4-neopentyl-5-tertiary butyl-1,2-dithiole-3-thione, which comprises charging about 1 molar proportion of tri-isobutylene in liquid form to contact with a reaction mass comprising about 5 molar proportions of molten sulfur and from about 10 to about 50 weight percent, based on said sulfur, of 4-neopentyl-5-tertiary butyl-1,2-di-thiole-3-thione in a reaction vessel which is vented to the atmosphere through a reflux condenser while maintaining the temperature within said vessel at from about 180° C. to about 240° C. whereby hydrogen sulfide formed in the resulting reaction is allowed to pass from the reaction vessel through the condenser substantially as rapidly as it is formed, but whereby at the same time any portion of the charged tri-isobutylene which is vaporized in the reaction vessel and which passes to the condenser is refluxed to the reaction vessel, continuing to maintain the temperature within the reaction vessel at the aforesaid level after all of the tri-isobutylene has been charged and at least until passage of hydrogen sulfide from the reaction vessel has substantially ceased and thereafter distilling the crude reaction product to recover the 4-neopentyl-5-tertiary butyl-1,2-dithiole-3-thione therefrom.

6. The method for treating a lower alkyl-substituted-1,2-dithiole-3-thione which is corrosive due to contamination thereof with small amounts of free sulfur, to make it substantially non-corrosive, which comprises contacting 1 molar proportion of said thione with about 0.1 molar proportion of di-isobutylene in a reaction vessel which is vented to the atmosphere through a reflux condenser, while maintaining the temperature of said vessel at from 180° C. to 240° C. whereby the di-isobutylene is continuously vaporized from and refluxed to contact with the dithiole-3-thione and continuing to maintain said refluxing conditions for a time sufficient to react all of said free sulfur to make the dithiole-3-thione non-corrosive and thereafter distilling the diisobutylene from contact with the treated lower alkyl-substituted-1,2-dithiole-3-thione.

7. The method for treating an alkyl-substituted dithiole-3-thione of the empirical formula $C_8H_{12}S_3$, which is corrosive due to contamination thereof with small amounts of free sulfur, to make such thione substantially non-corrosive which comprises contacting 1 molar proportion of said thione with about 0.1 molar proportion of di-isobutylene in a reaction vessel which is vented to the atmosphere through a reflux condenser while maintaining the temperature of said vessel at from 180° C. to 240° C. whereby the di-isobutylene is continuously vaporized from and refluxed to contact with the alkyl-substituted dithiole-3-thione and continuing to maintain such refluxing conditions for a time sufficient to react all of said free sulfur to make the dithiole-3-thione non-corrosive and thereafter distilling the di-isobutylene from contact with the treated alkyl-substituted-dithiole-3-thione.

8. The method for treating 4-neopentyl-5-tertiary butyl-1,2-dithiole-3-thione, which is corrosive due to contamination thereof with small amounts of free sulfur, to make it substantially non-corrosive, which comprises contacting 1 molar proportion of said thione with about 0.1 molar proportion of di-isobutylene in a reaction vessel which is vented to the atmosphere through a reflux condenser while maintaining the temperature of said vessel at from 180° C. to 240° C. whereby the di-isobutylene is continuously vaporized from and refluxed to contact with the alkyl-substituted dithiole-3-thione and continuing to maintain said refluxing conditions for a time sufficient to react all of said free sulfur to make the dithiole-3-thione non-corrosive and thereafter distilling the di-isobutylene from contact with the 4-neopentyl-5-tertiary butyl-1,2-dithiole-3-thione.

References Cited in the file of this patent

UNITED STATES PATENTS

| | | |
|---|---|---|
| 2,535,705 | Stevens | Dec. 26, 1950 |
| 2,653,910 | Airs | Sept. 29, 1953 |
| 2,658,900 | Stevens et al. | Nov. 10, 1953 |
| 2,660,563 | Banes | Nov. 24, 1953 |
| 2,688,620 | Gaudin | Sept. 7, 1954 |

FOREIGN PATENTS

| | | |
|---|---|---|
| 909,097 | Germany | Apr. 12, 1954 |

OTHER REFERENCES

R.S. Spindt et al.: J. Am. Chem. Soc., vol. 73, pages 3693 and 3697 (1951).